United States Patent [19]

Fennesz

[11] Patent Number: 5,537,506
[45] Date of Patent: Jul. 16, 1996

[54] WALL MOUNTED RADIATOR WITH REMOVABLE RADIANT COVER

[76] Inventor: Manfred Fennesz, Hartlebengasse 1-17, A-1220 Vienna, Austria

[21] Appl. No.: 681,502

[22] Filed: Apr. 5, 1991

[51] Int. Cl.[6] ............................ F28D 1/053; F24D 19/06
[52] U.S. Cl. ................................... 392/352; 165/55
[58] Field of Search ............................ 392/352, 353, 392/370, 371; 236/49.1, 36; 165/55

[56] References Cited

U.S. PATENT DOCUMENTS

| 1,776,080 | 9/1930 | Murray | 165/55 |
| 4,216,823 | 8/1980 | Keldmann | 165/55 |
| 5,042,570 | 8/1991 | Schmitt-Raiser et al. | 165/56 |

FOREIGN PATENT DOCUMENTS

| 444048 | 4/1994 | European Pat. Off. |
| 3022006 | 12/1981 | Germany |
| 9304321 | 3/1993 | WIPO |

Primary Examiner—John A. Jeffery

[57] ABSTRACT

A flat temperature-regulating device has at least one temperature-regulating element (heating or cooling element), at least one holding device and at least one flat cover. The holding device has a carrier module that is fixed to a wall by means of a holding element, supports both the temperature-regulating element and the cover and establishes a thermally conducting connection between the two.

19 Claims, 10 Drawing Sheets

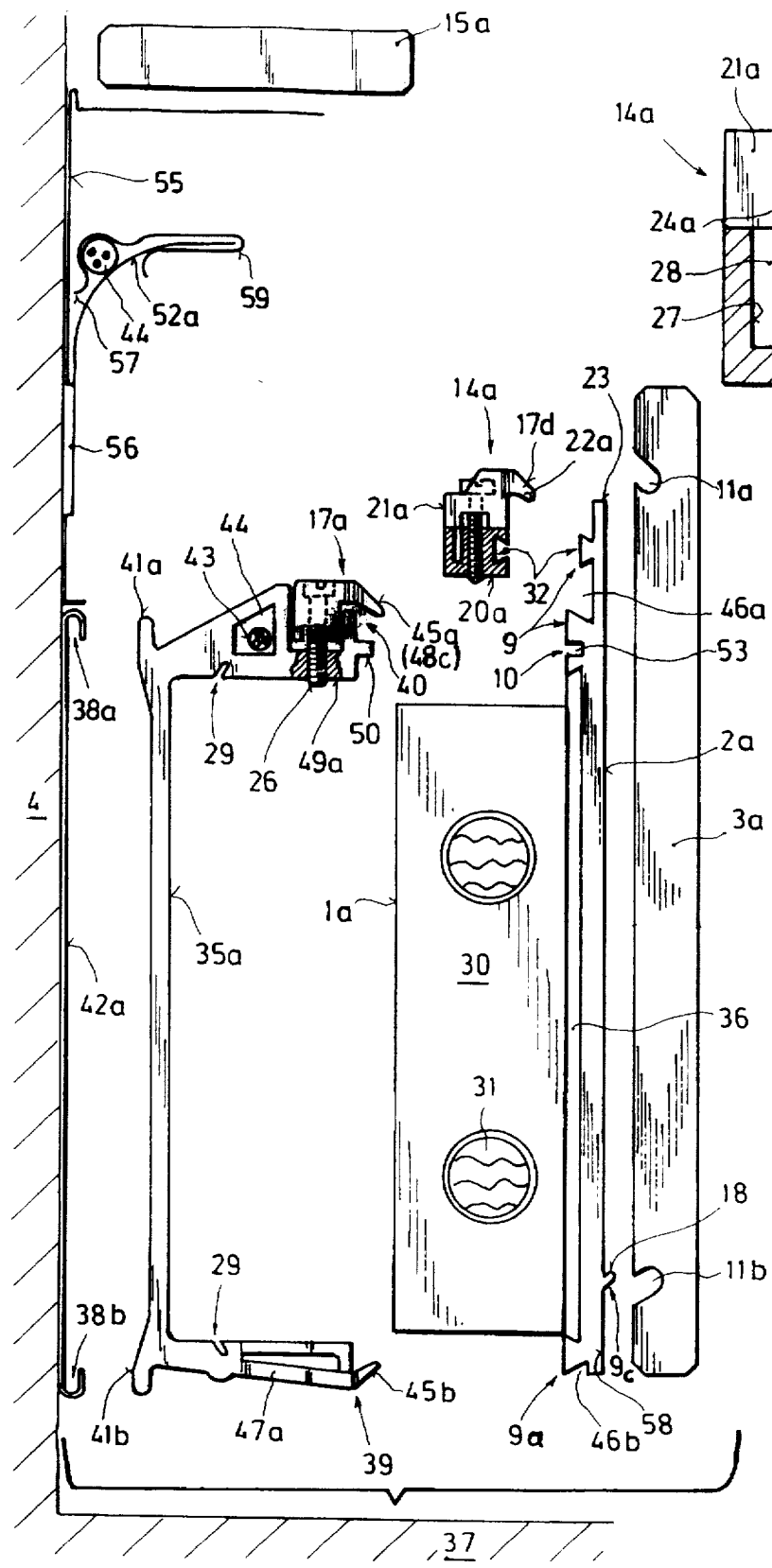
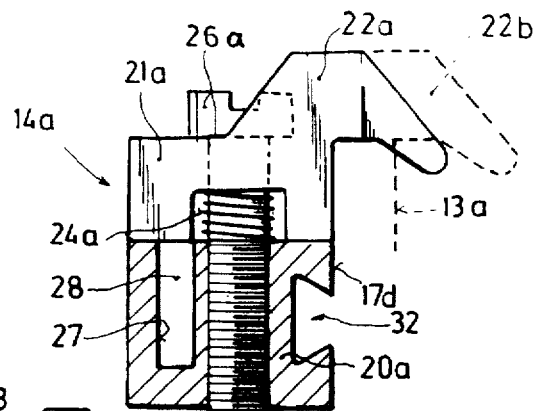
Fig. 1
Fig. 3

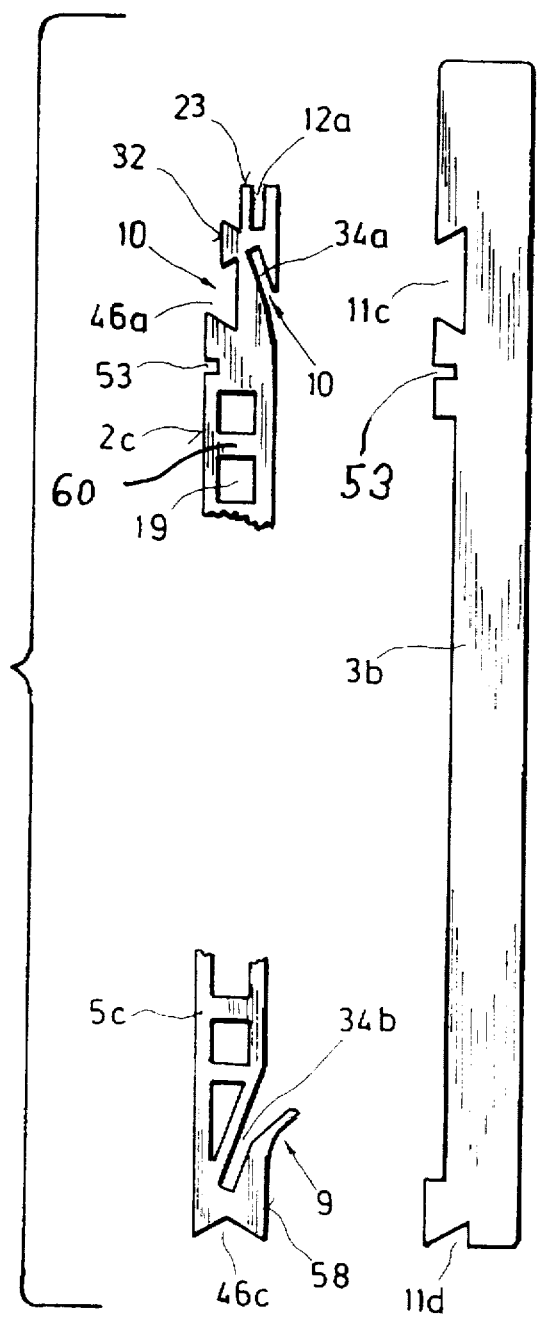
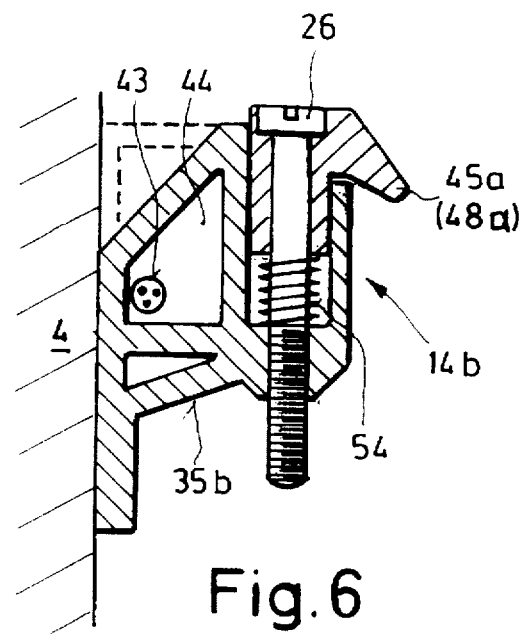
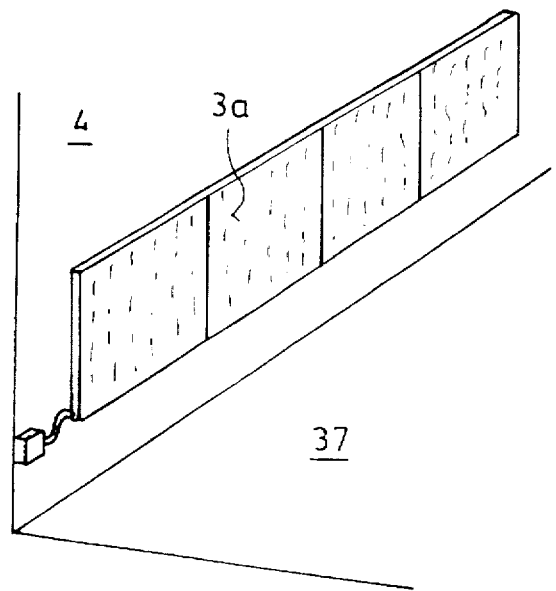

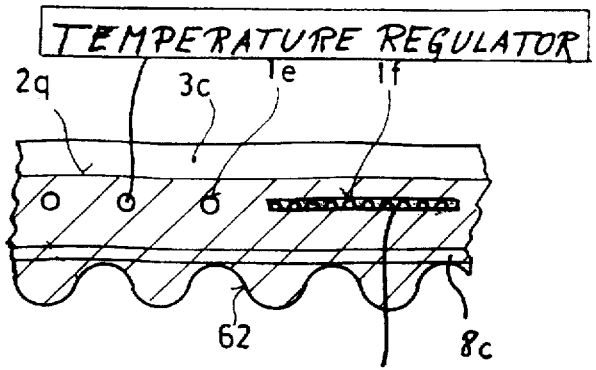
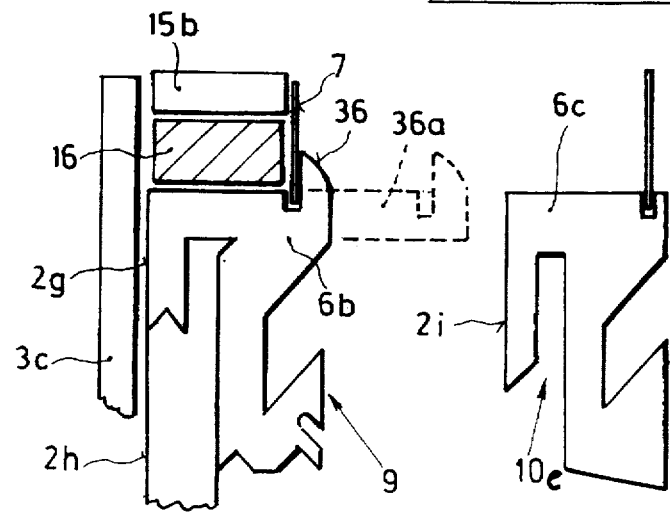
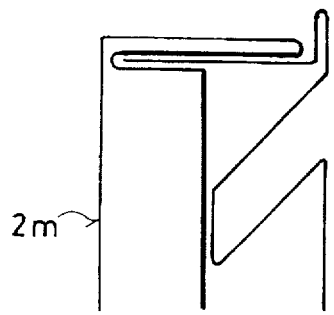
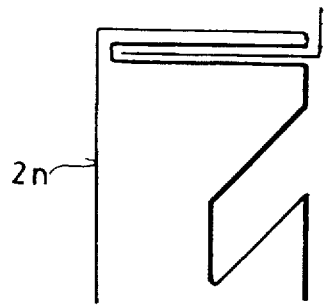
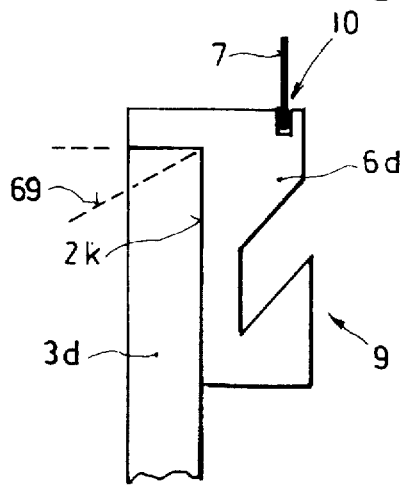

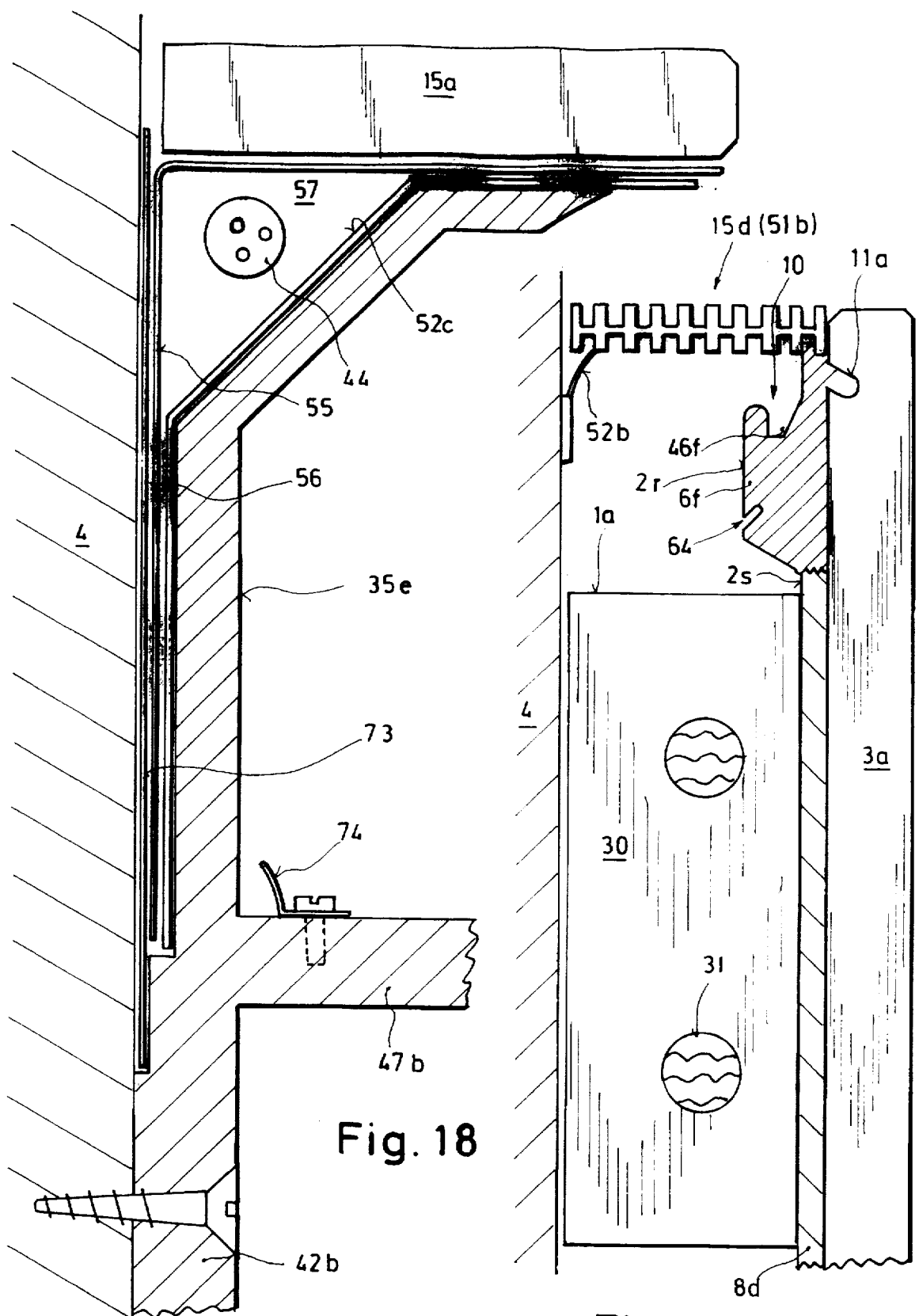

WALL MOUNTED RADIATOR WITH REMOVABLE RADIANT COVER

BACKGROUND OF THE INVENTION

The invention relates to a flat temperature-regulating device. For the purposes of the invention, the temperature-regulating device is understood as meaning a cooling or heating element, the term meaning in Central Europe, as a rule, in particular a heating element which can be supplied with heat energy electrically or by means of a heat-conducting medium and releases the heat energy into the room.

A long-known model of such a heating element has been disclosed, for example, under the name Thermoboard from the company Thermco AG. This heating element consists of a forward flow and return flow comprising a copper pipe with aluminium thermal conduction plates pressed on axially. These heating elements are held a distance away from the wall by means of beak-like holding elements which are mounted on this wall. To protect the thermal conduction plates and to achieve a chimney effect, the heating element is covered by a cover profile on its side facing away from the wall.

The chimney effect between the cover profile and the wall causes the air to flow past the heat conduction lamellae, leading to a transfer of heat by convection. The cover profile or cover plate is heated only to a small extent and radiates some heat into the room. However, on the basis of the high degree of radiant heat required today, this transfer of radiant heat is too small and, in a further development of the known heating element, a tiled heating strip was provided which, instead of the cover plate, envisages a ceramic radiation belt which is adhesively bonded to the lateral edges of the heat conduction plates. This construction permits a good ratio of convection heat output to radiant heat output. The heat radiated by the tiles is comparable with that of a tiled stove.

However, the disadvantage of this development is the necessity of adhesively bonding the heat conduction lamellae to the tiles. This makes it difficult to replace the tiles in the case of damage, which can occur very easily in the skirting board region, and if it is desired to change the design of the cover.

In the case of large heat outputs, the different thermal expansion coefficients of the tiles and of the metal parts have an adverse effect, with the result that deformations, thermal cracks, noises and torsions may occur. Moreover, such a tiled heating strip in the region of the lamellae is very inconvenient to clean since the tiled radiation belt restricts access to the heating element components behind, so that in the course of time dust and bacteria deposits may occur and may reduce the heat output and even lead to annoying odors.

STATEMENT OF THE INVENTION

It is therefore the object of the invention to provide a flat temperature-regulating device which avoids all of the above-mentioned disadvantages, is easy to mount, to transport and to store, furthermore permits problem-free changing or removal of the covers and, if required, should even be suitable for self-assembly. This object is achieved for the first time by the present invention, in which a wall-mounted temperature-regulating device has at least one temperature-regulating element, at least one holding device for holding the temperature-regulating element at least partially distinct from the wall, and at least one separate removable flat cover. The holding device includes a separate carrier module that is attached to the wall by means of at least one separate holding element. The carrier module is arranged to support the temperature-regulating element and the cover in face to face relation relative to each other to establish a thermal connection and transmit thermal energy there-between.

An essential feature is the carrier module, according to the invention, of the holding device. This permits easy mounting of the temperature-regulating device, and all parts can easily be stored and transported beforehand. The cover used may be made of all desired materials, primarily ceramic or mineral materials, as well as metallic materials or materials of wood or plastic, the latter of course serving not for the transfer of radiant heat but primarily only for chimney formation and decoration. The covers can be removed without removing the temperature-regulating elements and, for example, can be replaced, so that they can, for example, be adapted to new styles in the room. Mounting the temperature-regulating elements on the carrier module also has the advantage over the known element that any heat loss via the holding device into the wall is reduced. The carrier module itself can, however, be fastened to the wall by conventional holding means, as in the case of known heating means.

In most cases, the carrier module simultaneously serves as a thermally conducting module between the temperature-regulating element and the cover.

Effects and advantages of particular embodiments of the invention and further variants are evident from what follows and from the description of the Figures.

The carrier module may take the form an extruded profiled rail or profile plate, for example of aluminum, and permits, over its entire surface, good heat transmission to the cover. All required embodiments for fastening can be integrally formed so that installation is particularly simple and only a few components are required. Adaptation to local conditions is very easily possible by cutting the profiled rail to length on site. The profiled rail according to the invention could also be hollow, webs for heat conduction preferably passing through the cavity. This will provide a particularly stable carrier module. However, particularly narrow versions may also be produced from rolled profile sheet metal. Furthermore, the profiled rail itself may have channels for a heat conduction medium and thus be integrated with the heating element.

A frame construction permits a particularly space-saving arrangement of the temperature-regulating device, especially since the temperature-regulating element can then be held inside the frame. Metal frames have good stability whereas plastic frames are somewhat more temperature-sensitive but permit elastic fastening of the entire temperature-regulating device. Thermal expansions can thus be absorbed elastically and noiselessly.

The frame parts may have different thicknesses. In particular, the vertical, lateral frame parts can be broader than the upper and lower ones and thus laterally conceal all temperature-regulating elements. However, it is also possible entirely to dispense with the lateral frame parts so that the cover and temperature-regulating element are held only by two strips which may also be adhesively bonded to one of the two elements. The frame parts or other parts of plastic are preferably glass fiber-reinforced since this makes it possible to ensure good stability and suitable thermal expansion coefficients.

The interior of such frames can easily be filled during production with a thermally conducting or heat-storing casting compound of cement-bound minerals so that access for the fastenings is on the frame but heat conduction takes place via the ceramic or mineral plate. The plate could also be formed without a frame, but in the case of some materials this leads to a greater danger of breakage in the fastening region. The plate as a whole can also be prefabricated or may have a sandwich structure. It is also possible simultaneously to cast in heating or cooling rods or foils, so that the carrier module is integrated with the temperature-regulating element. The frame and plate are, as a rule, elastically bonded in order to compensate for expansions. Cavities in the frame are preferably provided with projections or grooves which interlock with the plate. The remaining cavities in the frame may be elastically filled in order to permit possible relative shifts between the frame and the plate.

One of the variants for mounting the cover on such a carrier module as last described is to stick on tiles—for example by the self-assembly method—which, if required, can be chiselled off again and replaced by new ones. In the conventional model, the tiles can be detached only with simultaneous damage to the lamellae. According to one embodiment of the invention in which the carrier module has hooked-shaped continuous contours (projections) and/or groove-like recesses), the cover is preferably formed on the carrier module.

Projections or grooves are readily provided during production of the carrier modules and during production of the covers. They are preferably provided at the upper and lower edges of the carrier module but may also be formed at the lateral edges, where, however, gravity has a troublesome effect during assembly; the components can easily slide downward out of the projections or recesses. Particularly in the lower region and in the case of projections which engage recesses in the cover, vertical support surfaces are required on the carrier module for the cover, since impacts on the cover should be absorbed by the carrier module in order to reduce the danger of breakage of the cover—especially in the region of the grooves, where the material is thin. Such carrier modules can be assembled on site and in a simple and logical manner. Close contact between the carrier module and the cover is ensured, resulting in good heat transmission. Where a heat insulator is provided as a cover, the projections or recesses project so that the vertical hand-side surface of the cover is at least a slight distance away from the carrier module. However, each projection is preferably also provided with a vertical support surface for the cover or the temperature-regulating element in order to reduce the flexural loads.

According to the invention, the contours are:

A) upper and lower swallowtail contours,

B) hook-shaped projectors arranged to snap into opposite grooves in the cover,

C) vertical guide grooves arranged for guide members on retaining clips,

D) a flat support surface for upper covers and supports,

E) adjacent, pressure-compensating attack surfaces for claw-shaped clamping elements and F) a threaded hole arranged to cooperate with a holding screw. The embodiment A permits insertion of the cover onto the carrier module, which constitutes the fastest method of assembly. The embodiment B enables a fitter to position and adjust the cover on the carrier module. The embodiment C permits play-free vertical guidance of skin clips, with the result that deformations during assembly are avoided. The embodiment D permits the upper surface of the carrier module and optionally of the cover to be covered in accordance with the design. This upper surface may also be L-shaped to permit any height variation, for example in connection with the choice of tiles of different dimensions for the cover, so that, if required, an L-shaped support bracket can also be inserted there. The vertical limb of the support bracket then serves as a support surface for the tile parts on the upper surface of the temperature-regulating device. Alternatively however, instead of the vertical limb of the L, it is also possible to provide a continuous groove into which a vertical support plate for the cover can be inserted. This support plate then performs the function of the vertical bracket limb. The embodiment E serves, in the same way as C, to reduce any deformations during assembly. The embodiment F, together with that according to B, represents a variant for simple installation, and the cover must be drilled for a screw. This variant is not preferred since it is difficult to produce the drilled holes beforehand in the correct place, and many cover materials are difficult to drill through. To this extent, fastening of the cover by means of a multi-part clamp connection having a claw-like projection that overlaps the upper edge of the carrier module and engages a groove in the side of the cover that faces the carrier module is also advantageous. Such a clamp connection holds the cover in a more or less invisible manner although it is itself easily accessible during installation. All clamping devices having expandable clamps are possible alternatives.

Variants and embodiments of the invention include a clamping element that has at least one first part and second part that are:

A) first and second parts connected together by a spring member,

B) first and second parts comprising a one piece spring clamp,

C) first and second parts each having at least one guide portion parallel to one another, D) first and second parts having a recess on one part and a parallel extending member on the other part, one part connected to said carrier module upon a swallowtail spring groove, and E) one part connected to the carrier module via a thread and a threaded hole in an upper edge of the carrier module, and the other part having a parallel guide that engages in a vertical recess in the upper edge of the carrier module.

A being very rapidly installable—merely by snapping on; that according to

B guaranteeing a very stable permanent connection; that according to

C and F reducing the danger of undesirable deformation during installation; that according to D managing with only two parts (a hook and a screw) although in this embodiment the necessity of establishing the threaded holes at certain distances or only on site is a disadvantage; and that according to E being capable of being brought into the correct position.

According to the invention, all known flat heating or cooling elements can be used as a temperature-regulating element, the energy source and the desired ratio of convection to radiant heat output being decisive for the choice of the element. In all cases of heating and cooling elements having a heat conduction medium, the elements are fastened to that side of the carrier module which faces the wall.

The processes known per se, such as, for example, bonding of thermally conducting lamellae in a resin-bound or cement-bound adhesive to the wall-facing surface of the carrier module, can be carried out. In the case of the carrier module made of sheet metal, the thermally conducting lamellae may also be integrated therewith so that, during installation of the temperature-regulating device, heating/cooling pipes can be inserted into the integrated carrier module. In certain circumstances, even the cover itself, which is integrated with the carrier module or with a frame structure thereof, could have suitable cavities for the introduction of heat conduction media. Particularly if heating or cooling devices are laid in a mineral, extruded or ceramic carrier module, the wall-facing embodiment thereof may also be wavy or ribbed, with the result that the release of convection heat on this side is increased. It is also possible to provide there heat conduction plates for the transmission of heat from the carrier module for the release of convection heat.

A plurality of temperature-regulating elements can also be temperature-regulating elements respectively attached to wall-facing and cover-facing surfaces of the carrier module and particularly advantageously coupled with one another; for example, two foil-like, electric elements which can be switched on individually and jointly may be provided. Electric heating elements may also be coupled to hot water elements for a transitional heating period.

For the purposes of the invention, it is also possible to apply heating elements to the carrier module by the screen printing process. On the other hand, the temperature-regulating element can be pressed against that surface of the carrier module that faces the wall, and conventional, beak-like shaped holding device is also provided for the temperature-regulating element, which device, in contrast to the known device, is fastened not to the wall but to the carrier module and thus presses the temperature-regulating element flat against the carrier module. If necessary, this pressure can also be applied by means of a holding device for the carrier module, which device on the one hand is fastened, or can be fastened, to the wall and on the other hand holds the carrier module or clamps the latter to itself. The temperature-regulating element can then be installed between the wall-facing region of the holding device and the carrier module, with the result that, when the holding module is mounted, the temperature-regulating element is also simultaneously fixed and is pressed against said module.

When a foil-like temperature-regulating element is used, it is envisaged, according to the invention, that it will be either integrated directly—for example by casting—in the carrier module or clamped between the carrier module and the cover, with the result that very good heat transmission to the cover is ensured and a very flat overall design can be achieved. In such constructions according to the inventions, attention is focused on the release of radiant heat, and it is also possible to provide, on the wall-facing side of the carrier module, thermally conducting lamellae for releasing convection heat. The the carrier module has two edge regions with slots opposite one another to receive the temperature-regulating element and hold it in clamped position. This arrangement facilitates installation since the temperature-regulating foil need only be inserted into the slots in order to be held on the carrier module. The slots may be formed from the solid material of the carrier module or formed by subsequent mounting of a shaped bracket or a plate.

According to the invention, the carrier module is held to the wall by holding elements of profiled material. The separate holding element has upper and lower regions with contours that are arranged to be connected with opposite mating contours on the carrier module. In theory, any conventional holding means may be provided for this purpose, but those with the embodiments according to the following features are advantageous: The separate holding element is:

A) a foot in the lower region for providing support at a predetermined height,

B) contours on that side of the separate holding element facing the wall that are arranged to be connected to corresponding mating contours on a wall holder fixed to the wall and serving as a heat reflector, C) a continuous profile with at least one hollow lug for holding items running therein, D) at least one hook in the upper and lower regions arranged to cooperate with opposite recesses in the carrier module, that are arranged to be bent toward one another and braced, E) a support for the carrier module in the lower region, F) a hook-shaped clamping part in the upper region arranged to be braced with opposite recesses in the carrier module, G) an extension on the separate holding part in the neighborhood of the clamping part that is arranged to engage an opposite parallel groove on the carrier module in such manner that on tightening the clamping part only the region between the clamping part and the extension can be clamped, a support in the lower region being held without clamping pressure relative to the clamping part, and H) a spring that interacts with the clamping part. The variants referred to there have the following properties:

A the foot facilitates installation at the correct height relative to the floor without expensive measurement and furthermore supports the weight of the temperature-regulating device after installation;

B pushing or snapping the holding means into a wall holder can be effected very rapidly and permits lateral adjustment of the holding means without complications. A wall lining is familiar in known heat output systems, but their additional function as a wall holder in combination with output of reflected heat constitutes a useful addition;

C being extruded material, the holding means can be produced in a correspondingly economical manner, and the lugs for cable guidance facilitate mounting and all installation cables can be readily concealed;

D similarly to the holding means of the cover, the clamp-like hook arrangement is a permanent construction which is easy to mount, the features of E, whereby the support keeps the carrier module a distance away from the floor;

F preventing a thin carrier module from being bent by the installation clamping pressure. The pins, strip or the like ensure that the carrier module is not subjected to any continuous compressive strain between the upper clamping part and the lower support or lower hook. Such a device can also be provided for the cover but as a rule is not required there owing to the sufficient rigidity thereof.

Instead of fastening by means of clamps, it is also possible for the purposes of the present invention to provide swallowtail-like or similar profiled connections in which the carrier module is merely pushed onto the holding means.

A further embodiment includes an air-permeable cover at the top of the device and a wall holder having a baffle plate that cooperates with the air-permeable cover. These features permit an attractive finish to the temperature-regulating device, the air baffle plate preventing direct contact between the ascending hot air and the wall. This makes it possible firstly to save energy and secondly to prevent dust deposits on the wall.

To reduce any expansion stresses and possible noises, all assembled parts can be made slidable at their points of contact by means of graphite lubricating paste or the like.

DESCRIPTION OF THE DRAWINGS

The invention is to be illustrated in more detail by way of example with reference to the drawings.

FIG. 1 shows a section of a temperature-regulating device, in exploded view;

FIG. 3 shows a detail from FIG. 1 for the connection between the carrier module and the cover;

FIG. 4 shows a variant of the carrier module according to FIG. 2;

FIG. 6 shows a detail of FIG. 5 for fastening the carrier module;

FIG. 7 shows an oblique view of a temperature-regulating device according to the invention;

FIG. 8, 8a, 8b and 9, 10, 10a show variants of a frame construction on a carrier module, FIG. 11 shows a section of a carrier module with integrated temperature-regulating elements;

FIG. 13 shows a frame-like carrier module with integrated plate and cast-in temperature-regulating element;

FIG. 18 shows a detail of a variant of a wall holder with a removable cover and

FIG. 19 shows a variant of a cover of wood or the like, which replaces the carrier module.

DETAILED DESCRIPTION OF PREFERRED EMBODIMENTS

Figure 2:
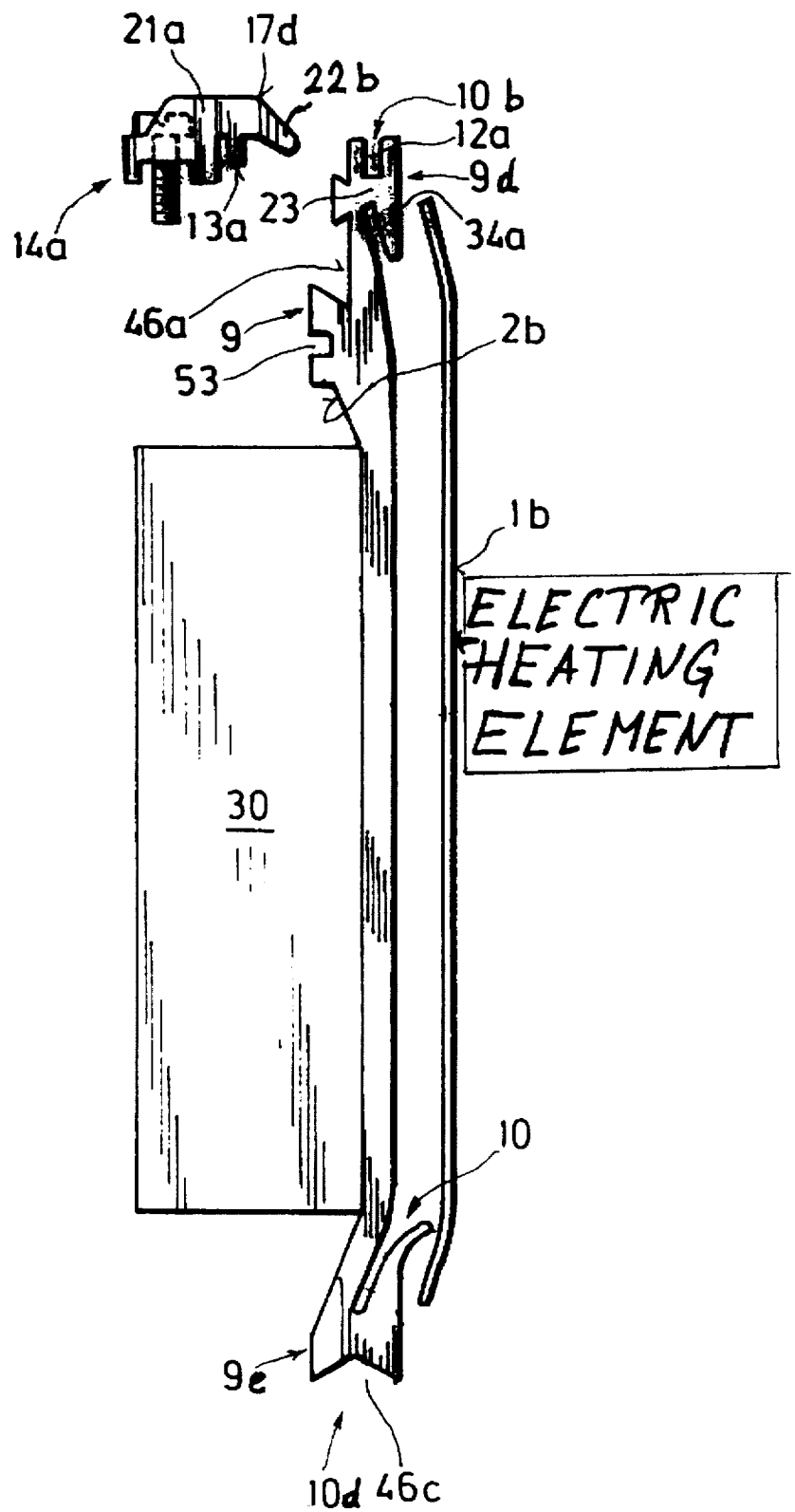
FIG. 2 shows a variant of a carrier module for electric foil heaters.

The Figures are described in relation to one another. Identical parts have identical reference symbols, and similar parts have identical reference symbols and different indices. The Figures and the description thereof are understood as being only examples, so that a large number of different variations are possible within the scope of the invention. The individual features can be combined with one another as desired.

The essential components of the invention can be clearly seen in the exploded view of FIG. 1. A rail-like wall holder 42a which has two recesses 38a and b which are formed by hooks is located on a wall 4. An insulation is usually provided between the wall holder 42a and the wall 4.

A pocket 56 which serves for insertion of a bent cover 55 is provided between an air baffle plate 52a and the wall 4 or a part of the wall holder 42a. The cover 55 forms a cable duct 57 which holds cables 44 between said cover and the air baffle plate 52a.

The cables 44 are firmly clamped there at certain points by means of a retaining clip 59. The cover 55 supports an upper cover 15a which, in conjunction with the front cover 3a of the temperature-regulating device, forms a visual unit and may also have a heat-storing or heat-radiating effect.

In the assembled state, projections 41a or b of a holding device holding element 35a, which has a C-shape when viewed in section, are present in the recesses 38a and 38b of the wall holder 42a. In the upper bar of the C shaped holding element is a lug 43 which likewise may hold cables 44. In addition, a holding part 49a having a horizontally projecting web 50 is provided, which web engages the parallel groove 53 in a carrier module. The holding part 49a also has a threaded hole which receives the screw 26. The screw 26 preferably acts against a spring 54, which is not shown (cf. FIG. 6) and, in the assembled state, holds a clamping part 48c with a hook 45a under tension against the holding part 49a. A recess 40 which cooperates with a swallowtail-like projection 9 of the profiled rail, which is the same carrier module 2a remains between the hook 45a and the web 50. If the screw 26 is tightened in the tensioning direction, the hook 45a clamps the projection 9 firmly. By means of the web 50 and the parallel groove 53, transmission of the tension from the hook 45a to the lower part of the carrier module 2a is prevented, which tension under certain circumstances otherwise could bend the carrier module 2a.

A support 47a having a hook 45b on a projection 39 of the holding element 35a is present in the lower region of C. This support 47a receives the lower half of the carrier module 2a. The latter is provided at the bottom—for example as shown—with a swallowtail-like projection 9a which in principle leaves a further recess 46b which is engaged by the hook 45b. During assembly, the carrier module can be simply mounted on the projection 39 and then swivelled into the vertical position until the projection 9 in the upper part connects with the clamping element 17a.

Grooves 29 which can be used from case to case for mounting clamps are present at the end of the crossbeam of the holding element 35a. Alternatively, cams are also possible there. The holding element 35a serves for holding the carrier module 2a. This itself holds, on its side facing away from the wall 4, a temperature-regulating element 1a which consists of thermally conducted lamellae 30, through which upper and lower pipes 31 are inserted. This is therefore a heat exchanger which can be used both for heating and for cooling purposes.

The thermally conducting lamellae 30 are connected at their end to the carrier module 2a (profiled rail or plate) by means of an adhesive 36 or by means of a clamping holder which is not shown. The carrier module 2a itself conducts the heat from the temperature-regulating element 1a to the cover 3a which rests flat against it and is held pressed against it by the holding clamp 14a. For better heat conduction, a thermally conducting contact layer may be applied between the carrier module 2a and the cover 3a.

The cover 3a is supported via a groove 11b on a hook-shaped support web 18 which projects as projection 9c from the carrier module 2a toward cover 3a. In the upper region of the cover 3a, the cover has a groove 11a which projects obliquely downward and which is engaged, in the assembled state, by a claw-like projection 22a of the holding clamp 14a. The claw-like projection 22a is part of a clamping element 17d which consists of a part 20a having a threaded hole and of a part 21a having a claw-like projection 22a, the two parts 20a and 21a being capable of being clamped together by means of a screw 26a (cf. FIG. 3). The part 20a has a swallowtail-like groove which, together with a swallowtail-like projection of the carrier module 2a, forms a swallowtail groove spring guide 32. The essential feature of this guide is the absorption of tensile and compressive forces. It is therefore also possible to provide groove/spring guides having a different shape, as well as, for example, spring catches.

The two parts 20a and 21a of the holding clamp 14a are kept pressed apart by a spring 24a (FIG. 3). Screwing together of the parts results in the cover 3a being pressed against the support 18 and hence fixed. The wedge-shaped bevel of the grooves 11a and 11b, together with the embodiments of the web 18 and of the projection 22a, cause the cover 3a to be braced by clamping on the carrier module 2a. A flat support surface 58 for the lower edge of the cover 3a, which reduces the danger of breakage in case of impact, is present under the support web 18.

As can be seen more clearly in FIG. 3, the part 20a is provided not only with a threaded hole but also with a hole or with a groove 27 which is engaged by a peg or web 28 of the other part 21a. 27 and 28 ensure exact parallel guidance of the parts 20a and 21a relative to one another. This parallel guidance can be further improved with respect to the carrier module 2b or 2c (FIG. 2 or 4) by forming, on the projection 22b, a further guide web 13a which can engage a diametrically opposed guide groove 12a in the carrier module (cf. FIG. 3, shown as a dashed line).

The same reference symbols with different indices in the other Figures are now described in connection with different embodiments and different effects, since they are otherwise understandable to one skilled in the art.

FIG. 2 shows that a wide variety of projections 9d and 9e and recesses 10b, 10c, and 10d may be present on the carrier module 2b, which projections and recesses form the guide groove 12a, for example in the region of the upper edge 23 of the carrier module 2b.

Slots 34a and 10c which are made in the carrier module 2b and correspond to a radius of curvature of a foil-like temperature-regulating element 1b are located in that side of the carrier module 2b which faces the cover. The temperature-regulating element 1b is, for example, a carbon fiber electric heating mat. The upper slot 34a is preferably deeper than the lower one in order to permit reversible insertion of the temperature-regulating element 1b.

The further recess 46c in the lower region has deliberately been bevelled in order to permit bracing with a holding means in cooperation with a hook 45a. Thermally conducting lamellae 30 which are intended to permit the release of convection heat from the temperature-regulating element 1b via the carrier module 2b (profiled rail) are located on that side of the carrier module 2b which faces the wall 4. Instead of the thermally conducting lamellae 30, it would also be possible to provide a complete temperature-regulating device according to FIG. 1 so that the temperature-regulating element according to FIG. 2 could be heated both electrically and by means of hot water.

FIG. 4 shows a carrier module 2c which has, in its interior, channels 19 which are formed by webs 60. The webs 60 are responsible for the heat conduction between the lateral surfaces of the carrier module 2c (profiled rail). A heat conducting medium could also be transported in the channels 19. The channels could then be combined so that, for example, only two large channels are formed, one of which serves for the forward flow and the other for the return flow.

Instead of the cover in the embodiment according to FIGS. 1, 2 and 4, it would also be possible directly to provide a cover 3b according to FIG. 19, which has identical recesses and projections to the carrier modules on the wall side. Such embodiments are preferably made of wood or the like.

FIG. 6 shows a variant as wall holding element 35b, which in particular is provided for high temperature-regulating devices, since it is in two parts and can be fastened to the wall 4 at any distance from a possible support such as shown at 47c in FIG. 1. In contrast to the clamping element 17a of FIG. 1, no horizontal web is provided in the case of the holding clamp (retaining clip) 14b according to FIG. 6.

Figure 5:
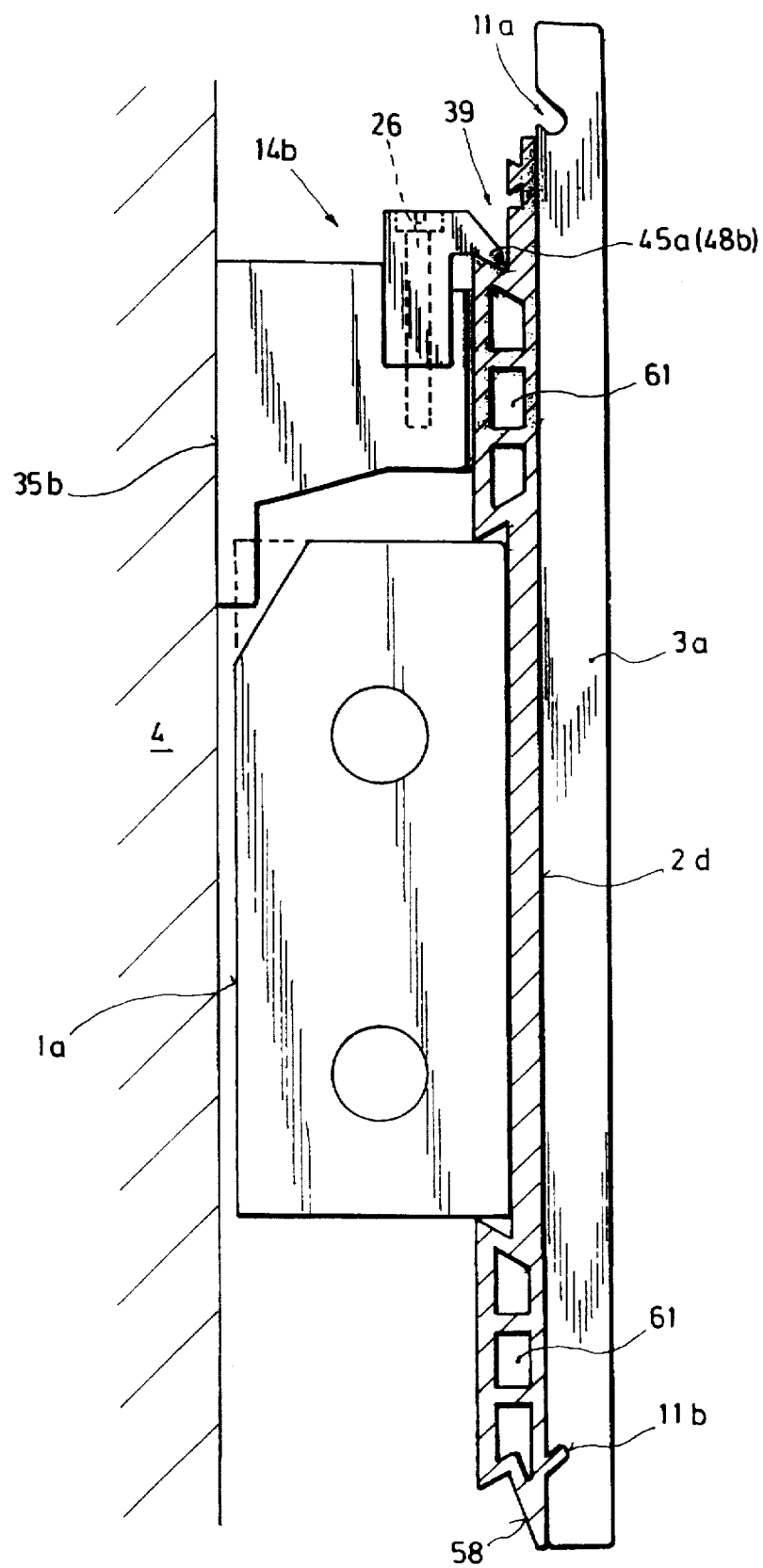
FIG. 5 shows a variant of a temperature-regulating device according to FIG. 1, without wall holder.

The variant according to FIG. 5 shows a somewhat modified carrier module 2x which has partial cavities 61 in the upper and lower region.

FIG. 7 shows a completely mounted temperature-regulating device comprising a plurality of assembled modules on a wall 4, which device is mounted at a relatively large distance from the floor 37. Retaining clips or screws or the like are visible neither at the front nor at the edges.

FIG. 8 shows a cross-section through a frame construction 6b which is formed, for example, from glass fiber-reinforced plastic and holds a plate 8b of heat-storing, for example ceramic or mineral, material in its internal passage.

The carrier module 2h or profiled plate with the frame 6b is primarily intended to permit the independent laying of the tiles as cover 3c on the carrier module 2h by amateurs. Any height compensation can be achieved by means of supports 16 and support plates 7, which latter are held, for example, in grooves 10e (FIG. 8b). Alternatively, angular support plates can also be inserted and, as soon as they are pressed downward by the weight of a support, act as a lateral support together with the upward-projecting angular part. An angular projection 36a may also be used as a support surface without a support plate 7.

In the lateral region of the temperature-regulating device, such a projection 36 may also be broader in order to conceal the temperature-regulating elements (cf. arm 36a shown as a dashed line in FIG. 8). FIG. 8a and b show variants of the frame 6b of FIG. 8, that of FIG. 8b having an inverted L-shape and if necessary being capable of being connected, for example adhesively bonded, to the upper edges of a cover 3d.

The dashed lines 69 indicate one of a plurality of undercuts, which are provided whenever the frame 6d is filled with a plate (cover 3d). The undercut prevents the plate from falling out at the front. Instead of the undercut, it is also possible for a fixing element, for example a screw, to pass through the frame from above in order to hold the plate.

Figure 9:
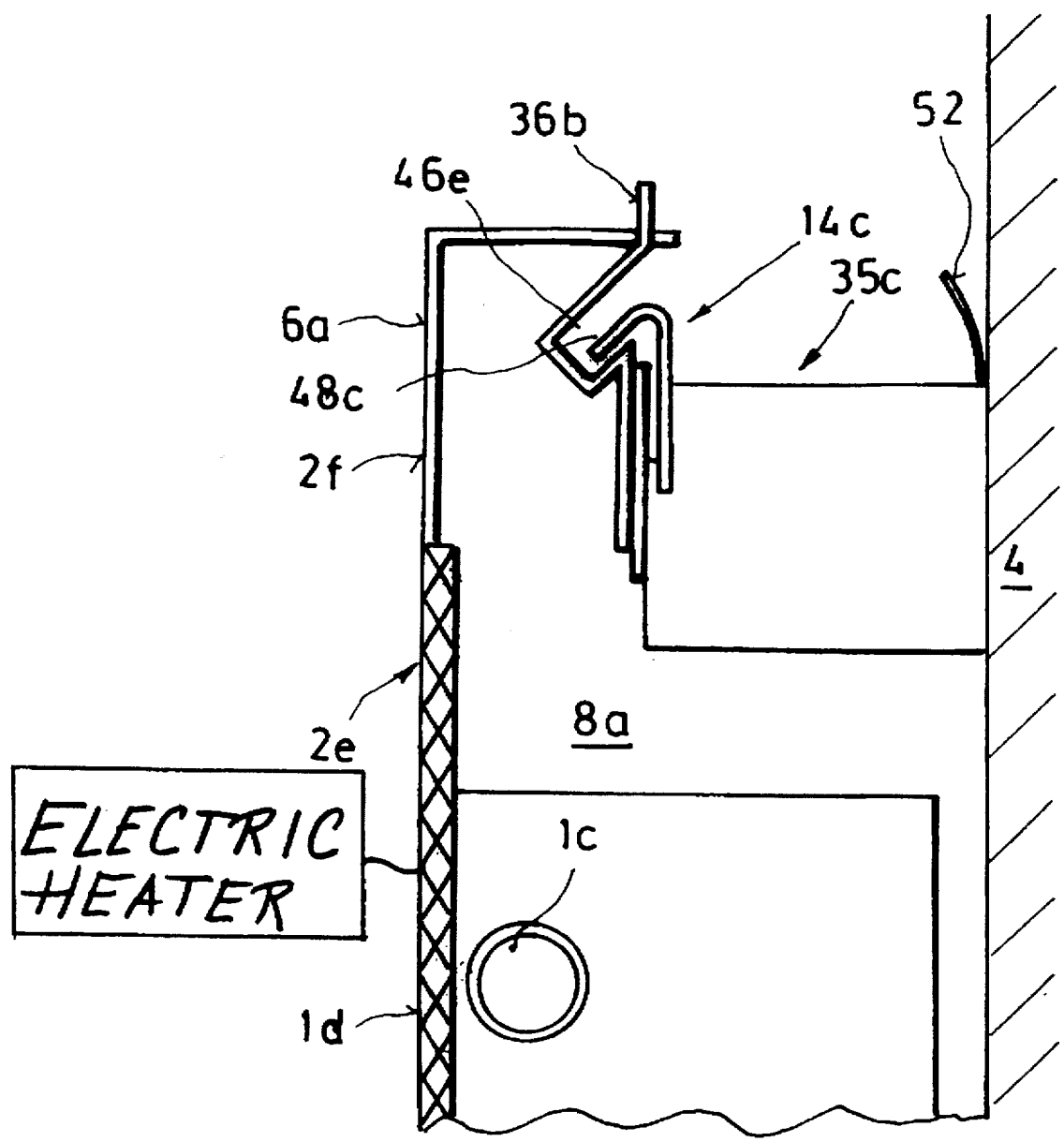

FIG. 9 shows a variant having a frame 6a and a plate 8a held by said frame, the frame 6a being formed from sheet metal angles and, like the plate 8a, being suitable in particular for sticking on tiles. The wall parts of the frame 6a may also have struts for stiffening and corner connections in the manner of picture frames, this not being shown. The plate 8a has temperature-regulating elements 1c which are cast in it. At the same time, a further flat temperature-regulating element 1d which can generate heat alternatively and in addition to the temperature-regulating element 1c is provided on the side facing away from the wall 4.

The clamping part 48c is an angular profile which—as shown schematically—is connected directly to the holding element 35c which is screwed to the wall 4.

FIG. 10, 10a show carrier modules 2m and n which consist in their entirety of multi-part shaped surfaces.

FIG. 11 shows a section of a carrier module 2q having a stuck-on cover 3c which has, on its side of the plate 8c which faces the wall, a wavy embodiment 62 which ensures greater release of convection heat. Two temperature-regulating elements 1e and 1f are also provided, as shown schematically.

The embodiment 62 extends along the heat convection direction but may also consist of nubs or the like. When the embodiment 62 is completely omitted, the result is a thin plate 8c. The remaining space can be insulated or can be filled with with heat-storing or insulating material.

Figure 12:
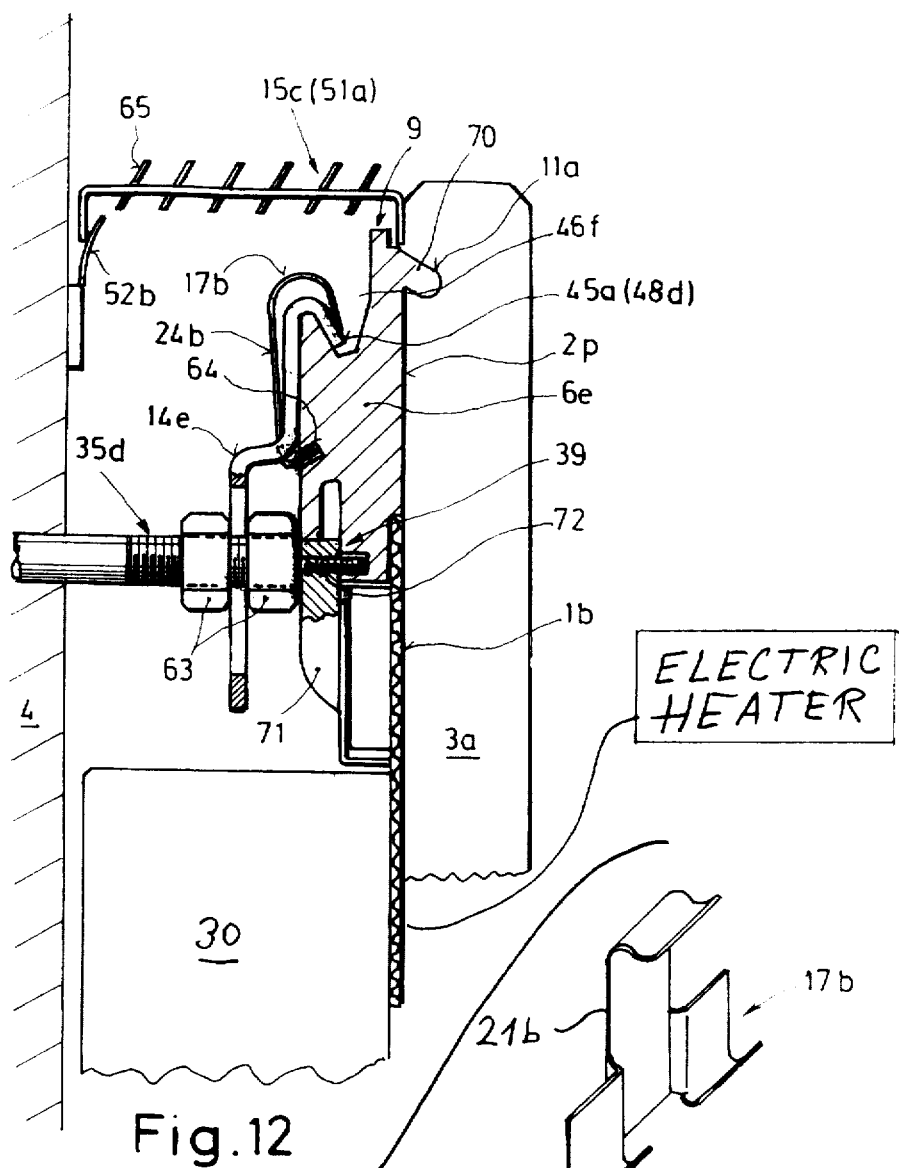
FIG. 12 shows a variant of the frame-like carrier module.
Figure 12A:
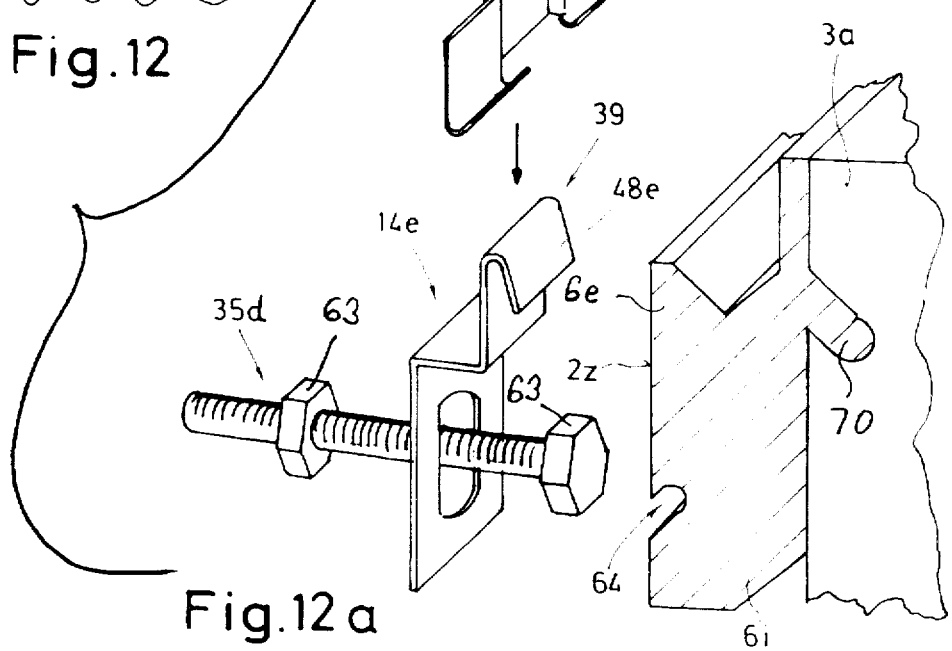
FIG. 12a is an isometric exploded view of another frame-like carrier module.

FIG. 12, 12a and 13 show another fastening system of the carrier module 2p or 2r which is bonded directly with the cover 3a and consists only of an upper and a lower strip. In FIG. 13, the upper and lower strips are also connected by a plate 8d which is adhesively bonded to the thermally conducting lamellae 30. Of course, the same profile can also be used to produce a solid frame construction.

A special feature of FIG. 12 is the wall holder 35d which in principle is a conventional screw bolt having two nuts 63 but, together with a retaining clip 14e which is guided with a slot guide on the holding means 35d and can be positioned by means of two nuts 63, constitutes a well functioning variant for fastening according to FIG. 1. A clamping element 17b acts as an installation aid which, on the one hand, engages a further recess 46f and, on the other hand, engages a directly adjacent parallel groove 64. The clamping element 17b has a spring member 24b and thus helps to position the holding module above the retaining clip 14e until the nuts 63 have been finally tightened. Instead of the movable projections 22, a rigid clamping web 70 for engagement in the groove 11a is provided. The clamping web 70 is preferably above the retaining clip 14e.

By means of the exploded view, FIG. 12a illustrates the function of the retaining clip 14e and of the clamping element 17b, which is mounted in piggy-back fashion over the retaining clip 14e.

The upper cover 15c (FIG. 12) is in the form of an air-permeable cover 51a which has baffle plates 65 which cooperate directly with the air baffle plate 52b and influence the direction of flow of ascending hot air. A retaining wedge 71 keeps the temperature-regulating element 1b and possible cover plates or the like connected to a groove in the frame 6e either loosely or by means of a screw connection (72). The carrier module 2s of FIG. 13 consists of the strips 6f (upper and lower parts of a frame), which adhere to the cover 3a and to a plate 8d that connects the lamellae 30 and the cover 3a. FIG. 13 also shows heating or cooling tubes 31 which cross the lamellae 30.

Figure 14A:
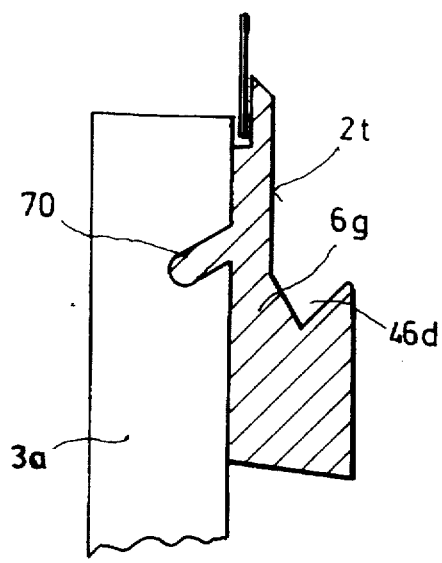
FIG. 14a and b show variants of a frame embodiment for a carrier module for tile laying by the self-assembly method.
Figure 14B:
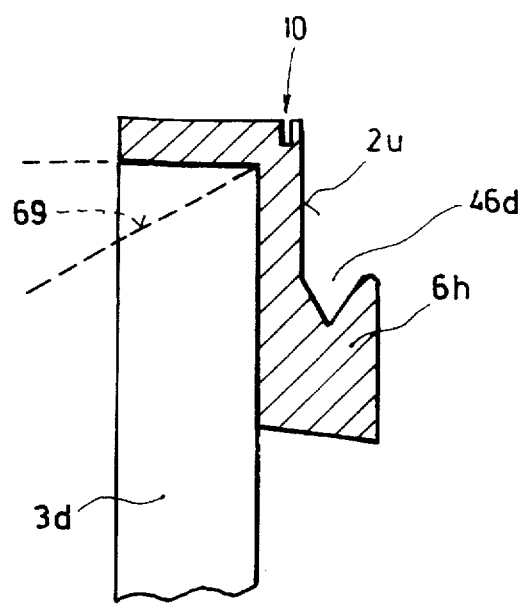

FIG. 14a and b show variations of the frame-like carrier modules according to FIG. 12 and 13, these being directly connected to the cover plates 3a and d.

Figure 15:
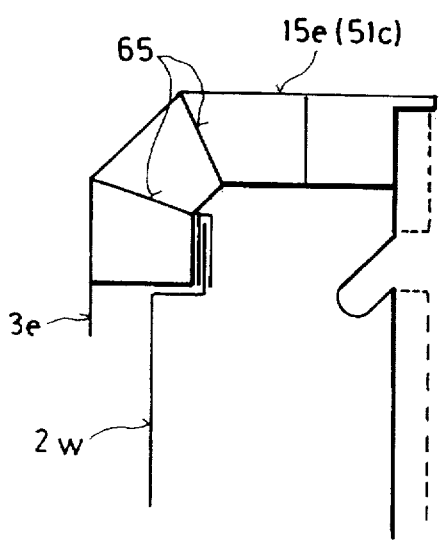
FIG. 15 shows a variant having a fan-shaped cover of the upper side of the temperature-regulating device.
Figure 16:
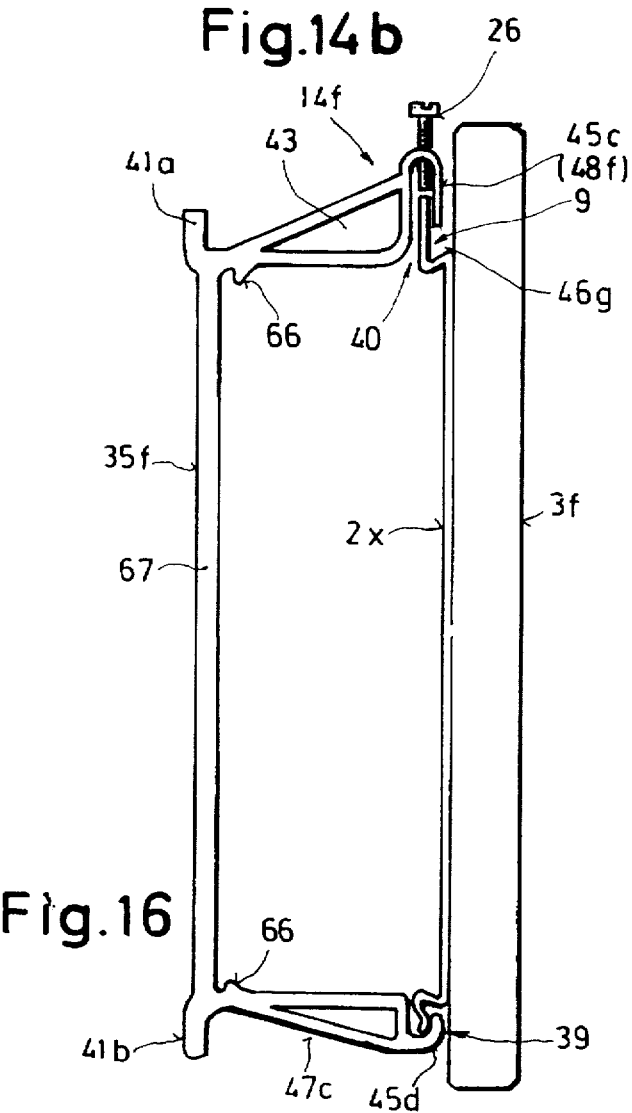
FIG. 16 shows a variant with a plate-like carrier module.

FIG. 15 shows air-permeable covers 51c which have decorative parts 65 mounted laterally or on top. The difference between the holding element 35f in FIG. 16 and that described previously as its upper, beak-shaped embodiment which, with a hook 45c, overlaps the carrier module 2x, which consists of a rolled metal sheet 5d, and makes it possible to tighten said carrier module by means of screw 26. Cams 66 in the region of the rear panel 67 of the holding element 35f serve as installation aids during insertion of a temperature-regulating element.

Figure 17:
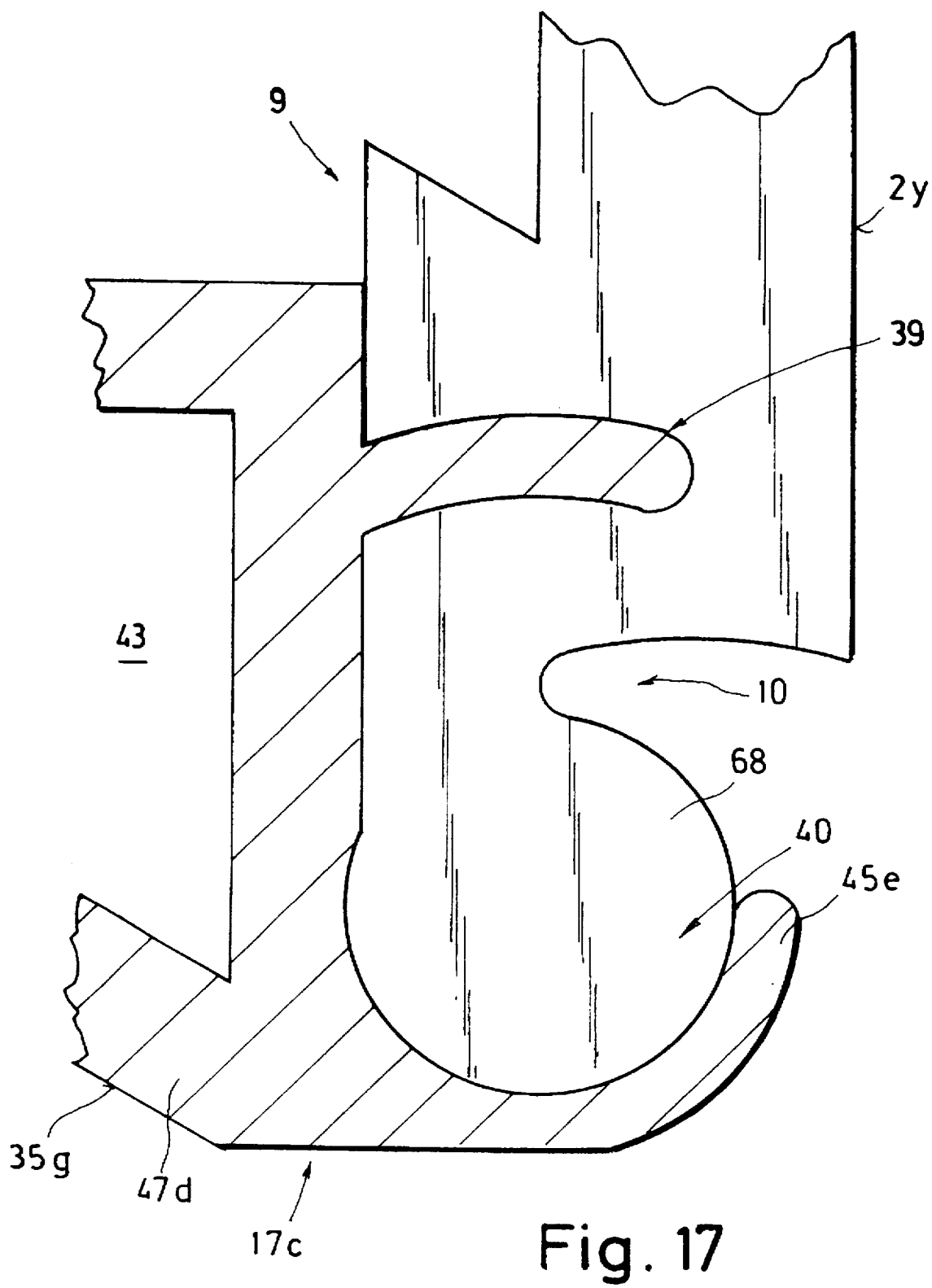
FIG. 17 shows a detail of a variant for supporting the carrier module by means of a holding element.

FIG. 17 shows the bottom part of a special embodiment of a holding element 35g, a hook 45e being formed there as a sliding hinge and holding the roller-like lower part 68 of a carrier module 2y (profiled rail) in a recess 40. A projection 39 which engages a diametrically opposite groove of the carrier module 2y is provided above the roller-like lower part 68, on the support 47d. This embodiment permits pivoting of the carrier module 2y as about a hinge. A specific inclination of the projection 39 can convert this into a clamping element 17c.

FIG. 18 shows a wall holder 42b which is integrated with a support 47b or with a holding element 35e of the carrier module. In contrast to the variant of FIG. 1, the wall holder can be mounted directly on the carrier module. A thin spring plate 73, together with the segment-like part 35e, forms a pocket 56, which once again has an air baffle plate 52c which is also heat-reflecting. The support 47b may also have a clamp 74 above or below, which holds a supply cable.

All embodiments designated as grooves in the description may also be in the form of a projection or hook, depending on their function, provided that the corresponding parts are diametrically opposite.

I claim:

1. A wall-mounted temperature-regulating device comprising:
   at least one temperature-regulating element,
   at least one holding device for holding said temperature-regulating element at least partially in spaced relation from a wall, and
   at least one removable flat cover separate from said holding device, wherein
   said holding device includes a carrier module that is spaced from and attached to said wall by means of at least one holding element separate from said carrier module, and
   said carrier module is arranged intermediate said wall and said cover to support said temperature-regulating element and said cover in face to face relation relative to each other to establish a thermal connection and transmit thermal energy therebetween.

2. A temperature-regulating device as claimed in claim 1, wherein said carrier module comprises a profiled plate.

3. A temperature-regulating device as claimed in claim 1, wherein said carrier module is an extruded profiled rail.

4. A temperature-regulating device as claimed in claim 3, wherein said carrier module has hook-shaped continuous contours in edge regions that are arranged to form clamped connections with said cover.

5. A temperature-regulating devise as claimed in claim 4, wherein said contours are selected from the group consisting of upper and lower swallowtail contours, hook-shaped projectors arranged to snap into opposite grooves in said cover, vertical guide grooves arranged for guide members on retaining clips, a flat support surface for upper covers and supports; adjacent, pressure-compensating attack surfaces for claw-shaped clamping elements, and a threaded hole arranged to cooperate with a holding screw.

6. A temperature-regulating device as claimed in one of claims 1 or 1, wherein said carrier module comprises a profiled plate with an upper edge, further comprising a multi-part clamping element for clamp connection between said profiled plate and said cover, having a first part connected to that side of said profiled plate that faces said wall and a second part having a claw-like projection that overlaps said profiled plate at said upper edge and engages and wedges in an opposite groove in that side of said cover that faces said profiled plate.

7. A temperature-regulating device as claimed in claim 6, wherein said clamping element has at least one first and second part selected from the group consisting of first and second parts connected together by a spring member, first and second parts comprising a one piece spring clamp, first and second parts each having at least one guide portion parallel to one another, first and second parts having a recess on one part and a parallel extending member on the other part, one part connected to said carrier module upon a swallowtail spring groove, one part connected to said carrier module via a thread and a threaded hole in an upper edge of said carrier module, and the other part having a parallel guide that engages in a vertical recess in the upper edge of said carrier module.

8. A temperature-regulating device as claimed in claim 1, wherein said temperature-regulating element is pressed against that surface of said carrier module that faces said wall.

9. A temperature-regulating device as claimed in claim 1, wherein said temperature-regulating element is attached to that surface of said carrier module that faces said wall.

10. A temperature-regulating device as claimed in claim 1, wherein said separate holding element has upper and lower regions with contours that are arranged to be connected with opposite mating contours on said carrier module.

11. A temperature-regulating device as claimed in claim 10, wherein said separate holding element comprises at least one element selected from the group consisting of a foot in said lower region for providing support at a predetermined height, contours on that side of said separate holding element facing said wall that are arranged to be connected to corresponding mating contours on a wall holder fixed to said wall and serving as a heat reflector, a continuous profile with at least one hollow lug for holding items running therein, at least one hook in said upper and lower regions arranged to cooperate with opposite recesses in said carrier module, that are arranged to be bent toward one another and braced, a support for said carrier module in said lower region, a hook-shaped clamping part in said upper region arranged to be braced with opposite recesses in said carrier module, an extension on said separate holding part in the neighborhood of said clamping part that is arranged to engage an opposite parallel groove on said carrier module in such manner that on tightening said clamping part only the region between said clamping part and said extension can be clamped, a support in said lower region held without clamping pressure relative to said clamping part, and a spring that interacts with said clamping part.

12. A temperature-regulating device according to claim 1, further comprising an air-permeable cover at the top of said device.

13. A temperature-regulating device according to claim 12, further comprising a wall holder having a baffle plate that cooperates with said air-permeable cover.

14. A temperature-regulating device according to claim 1, further comprising a wall holder having an angled, removable cover arranged to be inserted in a groove-like pocket.

15. A temperature-regulating device according to claim 14, further comprising a curved air baffle plate having an upper side with an open cable duct.

16. A temperature-regulating device as claimed in claim 1, wherein said carrier module comprises a frame construction.

17. A temperature-regulating device as claimed in claim 1, wherein said carrier module is selected from the group consisting of an assembly of profiles, ceramic material and mineral material.

18. A temperature-regulating device as claimed in claim 1, wherein said temperature-regulating element is clamped between said carrier module and said cover, and said carrier module has two edge regions with slots opposite one another to receive said temperature-regulating element and hold it in clamped position.

19. A temperature-regulatory device as claimed in claim 18, comprising two temperature-regulating elements respectively attached to wall-facing and cover-facing surfaces of said carrier module.

* * * * *